United States Patent Office 2,863,488
Patented Dec. 9, 1958

2,863,488

POLYMERS FROM CARBAMATES OF ARYL-SUBSTITUTED BUTENYL ALCOHOLS AND CORRESPONDING THIONO CARBAMATES

James N. Short, Alvin C. Rothlisberger, and Archie E. Follett, Borger, Tex., assignors to Phillips Petroleum Company, a corporation of Delaware No Drawing. Application May 12, 1955
Serial No. 507,996

27 Claims. (Cl. 152—330)

This invention relates to the production of polymeric products. In one aspect this invention relates to the production of polymers of carbamates of aryl-substituted butenyl alcohols and the corresponding thiono carbamates. In another aspect this invention relates to the production of copolymers of these carbamates with comonomers polymerizable therewith. In a further aspect this invention relates to polymeric products ranging from liquids to elastomers to hard resins, so produced.

The polymerization of butadiene and its homologues, analogues, and derivatives, either alone, or in admixture with other unsaturated compounds such as styrene, acrylonitrile, and the like, to produce polymeric products, has long been known to the art, and while many of these polymeric products have been applied successfully, many of them have limited application in certain areas. We have discovered a new class of polymerizable organic compounds suitable for use in the production of polymers having unexpected physical properties superior to the aforementioned known synthetic polymeric products.

An object of this invention is to produce novel polymeric products from a new class of polymerizable organic compounds.

A further object is to produce a variety of polymeric products ranging from liquids to elastomers to hard resins having novel properties.

Another object is to produce polymeric products from polymerizable carbamates of aryl-substituted butenyl alcohols and the corresponding thiono carbamates.

Still another object is to produce polymeric products by the copolymerization of these carbamates with comonomers polymerizable therewith.

Other objects and advantages of this invention will become apparent, to one skilled in the art, from the accompanying disclosure and discussion.

In accordance with this invention, the new class of polymerizable compounds may be represented by the structural formula:

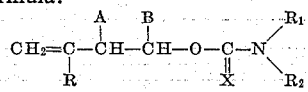

wherein R is an aryl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and monoolefinic, cyclic and acyclic, and aromatic radicals. The total number of carbon atoms in R, the sum of carbon atoms in $R_1$ and $R_2$ and the total number of carbon atoms in either $R_1$ or $R_2$, each does not exceed 12. In this structural formula, R, $R_1$, and $R_2$ may have substituents such as fluorine, chlorine, bromine and iodine, hydroxy, cyano, keto, carboxy, alkyl, aryl, aralkyl, alkoxy, aryloxy, amino, and substituted amino groups. In $R_1$ and $R_2$ if one of them is a vinyl group, then the other must be a radical other than hydrogen.

Representative monomers coming within the above identification and useful in the practice of this invention include: 3-phenyl-3-butenyl carbamate; 3-(4-chlorophenyl)-3-butenyl carbamate; 3-(2,4-dimethylphenyl)-3-butenyl carbamate; 3-(4-methoxyphenyl)-3-butenyl carbamate; 3-(2-methoxyphenyl)-3-butenyl carbamate; 3-(2,4,6-trimethylphenyl)-3-butenyl carbamate; 3-(4-N,N-dimethylaminophenyl)-3-butenyl carbamate; 2-methyl-3-phenyl-3-butenyl carbamate; 2-ethyl-3-phenyl-3-butenyl carbamate; 1-methyl-2-ethyl-3-phenyl-3-butenyl carbamate; 3-phenyl-3-butenyl N-methylcarbamate; 3-phenyl-3-butenyl N-hydroxyethylcarbamate; 2-methyl-3-phenyl-3-butenyl N-methylcarbamate; 3-phenyl-3-butenyl N,N-diethylcarbamate; 1-methyl-3-phenyl-3-butenyl N,N-diethylcarbamate; 1-methyl-2-ethyl-3-phenyl-3-butenyl N,N-diethylcarbamate; 3-phenyl-3-butenyl N-dodecylcarbamate; 3-phenyl-3-butenyl N-ethyl-N-phenylcarbamate; 3-phenyl-3-butenyl N,N-diphenylcarbamate; 1-methyl-2-ethyl - 3 - phenyl - 3 - butenyl - N,N - diphenylcarbamate; 3-phenyl-3-butenyl N-hexylcarbamate; 3-phenyl-3-butenyl N-ethyl-N-hexylcarbamate; 3-phenyl-3-butenyl N-cyclohexylcarbamate; 3-phenyl-3-butenyl N-cyclohexenylcarbamate; 3-(4-chlorophenyl)-3-butenyl N-ethyl-N-phenylcarbamate; 3-phenyl-3-butenyl N-methyl-N-vinylcarbamate; 3-phenyl-3-butenyl N-methyl-N-propenylcarbamate; 3-phenyl-3-butenyl N-ethyl-N-butenylcarbamate; 3 - phenyl - 3 - butenyl N - propenyl - N - phenylcarbamate; 3-phenyl-3-butenyl N-monochloropropyl-N-phenylcarbamate; 3-phenyl-3-butenyl N-methoxymethylcarbamate; 3-phenyl-3-butenyl N-cyanoethylcarbamate; 3-phenyl-3-butenyl N-carboxypropylcarbamate; and 3-phenyl-3-butenyl N-3-ketobutylcarbamate. Corresponding thiono compounds include: 3-phenyl-3-butenyl thionocarbamate; 2-methyl-3-phenyl-3-butenyl thionocarbamate; 3-phenyl-3-butenyl N-methylthionocarbamate; 1-methyl-2-ethyl-3-phenyl-3-butenyl N-ethylthionocarbamate; 3-phenyl-3-butenyl N-methyl-N-ethylthionocarbamate; 3-phenyl-3-butenyl N-hexylthionocarbamate; 3-(4-methoxyphenyl)-3-butenyl N-methylthionocarbamate; and 3-(4-N,N-dimethylaminophenyl)-3-butenyl N-hexylthionocarbamate.

The preferred species are 3-phenyl-3-butenyl N-ethylcarbamate and 3-phenyl-3-butenyl N-phenylcarbamate. A method which can be employed for the production of many of these carbamates and the corresponding thionocarbamates is by the interaction of 2-phenyl-4-hydroxy-1-butene with an isocyanate or an isothiocyanate. The butenyl alcohol can be prepared by the method set forth by Price, Benton, and Schmidle, J. Am. Chem. Soc., 71, 2860 (1949) wherein 2-phenyl-4-acetoxy-1-butene is hydrolyzed in hot aqueous alkali to yield 2-phenyl-4-hydroxy-1-butene.

In the practice of this invention, these new monomeric materials can be polymerized with comonomers copolymerizable therewith. Representative comonomers containing an active vinylidene group, i. e., $CH_2=C<$, include: conjugated dienes such as 1,3-butadiene, isoprene, chloroprene, 2,3-dimethyl-1,3-butadiene, 1,3-pentadiene; those dienes capable of co-reacting sufficiently to give significant monomer reactive ratios as defined by Mayo and Walling, Chem. Rev., 46, 196 (1950); other copolymerizable monomers including isobutylene, styrene, maleic anhydride, unsaturated ethers or esters, vinylidene chloride, acrylonitrile, methyl vinyl ketone, acrylic esters, methacrylic esters, and other monoolefins capable of co-reacting sufficient to give significant monomer reactivity ratios. Vinylpyridines, such as 2-methyl-5-vinylpyridine, are also applicable.

In the preparation of polymers by the practice of this invention, the amount of carbamate can be varied from 0.1 to 100 parts by weight of the monomeric material. Generally, at least 1 part by weight of the carbamate is employed per hundred parts by weight of the monomeric material, it being understood that mixtures of different carbamates can be employed as well as mixtures of these compounds with various other monomeric materials.

The polymeric products of the present invention can be made by any one of several known polymerization methods such as mass or emulsion polymerization, although emulsion polymerization is to be preferred in preparing copolymers because of well known operating advantages. Furthermore, polymerization can be effected by a free radical mechanism such as that initiated by peroxides, persulfates, hydroperoxides, diazo thioethers, and the like, or by ionic mechanism such as occurs in acid- or base-catalyzed polymerization initiated by sulfuric acid, boron trifluoride, aluminum chloride, sodium, sodium amide, sodium alkyl, etc.

Depending upon the method of polymerization employed and the recipe used, the temperature of polymerization can vary over a very broad range. When emulsion polymerization is employed, the polymerization temperature is usually between —40 and 70° C. When Friedel-Crafts type catalysts are employed, e. g., aluminum chloride, boron trifluoride, etc., the polymerization temperature is sometime as low as —100° C. or even lower. In instances where catalysts of the alkali metal type are chosen, temperatures in the range between 20 and 110° C. can be employed.

A particularly valuable group of high molecular weight polymeric products which can be prepared according to this invention are those in which a copolymer is prepared using 3-phenyl-3-butenyl N-ethylcarbamate and 3-phenyl-3-butenyl N-phenylcarbamate as comonomers with a conjugated diene such as butadiene, or with a mixture of a conjugated diene and 2-phenyl-4-hydroxy-1-butene as the comonomers. These new polymeric products can be prepared using 0.5 to 99.5 parts by weight of the carbamate per hundred parts of monomer. To obtain rubber-like polymeric products, we prefer to use from 0.5 to 60 parts by weight of the carbamate per hundred parts of monomer.

Although the superiority of these new polymeric products depends on the particular application to which they are put, as well as the choice of reactants and reaction conditions, we have found that these new polymeric products have in general very desirable and unexpected physical properties. A particularly valuable polymeric product was obtained by copolymerizing 3-phenyl-3-butenyl N-ethylcarbamate with 1,3-butadiene. This polymeric product exhibited high hot tensile strength and high aged tensile strength and may be successfully compounded as tread stock for pneumatic tires. This polymeric product was also found to be superior to a butadiene/styrene rubber and natural rubber in abrasion resistance. Superiority in flex life was also exhibited compared to a butadiene/2-phenyl-4-hydroxy-1-butene rubber and a butadiene/styrene rubber, making the new polymeric product well suited for carcass stock application in pneumatic tires.

These new polymeric materials are also useful as casting resins, potting compounds, and as binders for solid materials. They can contain reinforcing agents, various pigments, dyes, etc. Filaments having valuable properties can be formed from the polymers of this invention. Polymers made from this new class of polymerizable compounds are particularly valuable as plastics, coating resins, coating compositions and the like.

In particular, copolymers made from our new class of polymerizable materials and conjugated dienes can be vulcanized, compounded, and otherwise modified in manners similar to those used in treating other natural and synthetic rubber-like materials. Sulfur may be used as a compounding ingredient either in a small amount to effect vulcanization or in larger amounts to produce harder, less elastic products. Carbon black, silica, and zinc oxide may be used as reinforcing agents, in the practice of this invention, although carbon black is usually preferred because of its better reinforcing properties. Plasticizers, fillers, and the like, may be added in known manners and amounts to produce polymeric materials having certain desired properties. In many instances the original polymerization can be carried out in the presence of such materials.

Our invention will be further illustrated and defined by the following examples.

*Example I*

3-phenyl-3-butenyl N-ethylcarbamate was prepared by reacting equimolar proportions of 2-phenyl-4-hydroxy-1-butene with ethyl isocyanate at room temperature. The solid product, after two crystallizations from n-pentane containing a small amount of toluene, was in the form of white plate-like crystals and had a melting point of 44.5–45.0° C. Analysis for nitrogen gave a value of 6.29 weight percent (theoretical, 6.39 percent). The compound was recrystallized from n-pentane two additional times. Each time the melting point was 45.8–46.2° C. The bromine number, determined by bromide-bromate electric eye titrameter method, was 73 (theoretical, 73.0).

The 3-phenyl-3-butenyl N-ethylcarbamate, prepared as described above, was copolymerized with butadiene at 41° F. in accordance with the following recipe:

|  | Parts by Weight |
|---|---|
| Butadiene | 75 |
| 3-phenyl-3-butenyl N-ethylcarbamate | 25 |
| Water | 180 |
| Potassium fatty acid soap | 5 |
| Tert-dodecyl mercaptan | 0.18 |
| Diisopropylbenzene hydroperoxide | 0.107 |
| $FeSO_4 \cdot 7H_2O$ | 0.140 |
| $K_4P_2O_7$ | 0.165 |
| KCl | 0.50 |

Coagulation was effected by the salt-alcohol method. A conversion of 64 percent was obtained in 9.6 hours. The polymer had a Mooney value (ML–4) of 50.

The butadiene/3-phenyl-3-butenyl N-ethylcarbamate rubber, a 75/25 butadiene/2-phenyl-4-hydroxy-1-butene rubber (50 ML–4), 90/10 butadiene/styrene rubber (56 ML–4), 75/25 butadiene/styrene rubber (52 ML–4), butadiene/acrylonitrile rubber (Paracril B), and natural rubber (No. 1 Smoked Sheet) were compounded and evaluated in a tread recipe. The butadiene/2-phenyl-4-hydroxy-1-butene and butadiene/styrene rubbers were all prepared by emulsion polymerization at 41° F. The compounding recipes were as follows:

|  | Parts by Weight | |
|---|---|---|
|  | Synthetic Rubbers | Natural Rubber |
| Rubber | 100 | 100 |
| Carbon black (Philblack O) | 50 | 50 |
| Zinc oxide | 3 | 5 |
| Stearic acid | 2 | 3 |
| Flexamine [1] | 1 | 1 |
| Circo-Para [2] | 5 |  |
| Sulfur | 1.75 | 2 |
| Santocure [3] | variable [4] | 0.4 |
| Pine Tar |  | 4 |

[1] Physical mixture containing 65 percent of a complex diarylamine-ketone reaction product and 35 percent of N,N-diphenyl-p-phenylenediamine.
[2] A blend of equal parts of Circosol-2XH with Paraflux. Circosol-2XH is a hydrocarbon softener, containing hydrocarbons of high molecular weight, in the form of a heavy, viscous, transparent, pale green, odorless liquid of low volatility; sp. gr. 0.940; Saybolt Universal viscosity at 100° F., about 2,000 seconds. Paraflux is a saturated polymerized hydrocarbon.
[3] N-cyclohexyl-2-benzothiazolesulfenamide.

|  | Santocure, parts |
|---|---|
| [4] Rubber: |  |
| Butadiene/3-phenyl-3-butenyl N-ethylcarbamate | 0.75 |
| Butadiene/2-phenyl-4-hydroxy-1-butene | 0.75 |
| 90/10 butadiene/styrene | 1.0 |
| 75/25 butadiene/styrene | 1.0 |
| Paracril B | 0.8 |

The stocks were compounded, cured 30 minutes at 307° F., and physical properties were determined. The following results were obtained:

|  | Butadiene/3-phenyl-3-butenyl N-ethylcarbamate | Butadiene/2-phenyl-4-hydroxy-1-butene | 90/10 butadiene/styrene | 75/25 butadiene/styrene | Paracril B | Natural rubber |
|---|---|---|---|---|---|---|
| Unaged Samples: | | | | | | |
| Compression set, percent | 16.7 | 13.7 | 16.2 | 19.5 | 16.3 | 20.2 |
| 300 percent Modulus, p. s. i., 80° F | 1,265 | 2,090 | 1,820 | 1,500 | 2,200 | 1,410 |
| Tensile, p. s. i., 80° F | 3,600 | 3,650 | 3,420 | 3,290 | 3,600 | 2,960 |
| Elongation, percent, 80° F | 570 | 470 | 460 | 545 | 440 | 480 |
| 200° F. maximum tensile, p. s. i. | 2,180 | 1,760 | 1,960 | 1,800 | 1,400 | 2,500 |
| $\Delta T$ ° F | 67.2 | 61.2 | 62.2 | 66.6 | 75.0 | 49.0 |
| Resilience, percent | 63.0 | 54.1 | 62.2 | 60.4 | 58.9 | 66.6 |
| Flex life, thousands of flexures to failure | 18.9 | 8.5 | 4.3 | 23.3 | 25.1 | [1] 47% |
| Shore hardness | 56.5 | 62 | 60.5 | 57.5 | 61 | 59 |
| Abrasion loss, grams | 7.18 | 5.01 | 6.77 | 9.57 | 6.54 | 10.04 |
| T-R freeze point, ° F | −56 | −43 | −65 | −44 | −27 | −59 |
| Compounded MS-1½ | 41 | 39.5 | 44.5 | 42.5 | 57 | 45 |
| Extrusion at 250° F.— | | | | | | |
| Inches/minute | 38.2 | 29 | 31.8 | 46.6 | 23.5 | 53.5 |
| Grams/minute | 83 | 68 | 80 | 93 | 63 | 77 |
| Oven Aged 24 Hours at 212° F.: | | | | | | |
| 300 percent Modulus, p. s. i., 80° F | 2,160 | ---------- | 3,000 | 1,510 | ---------- | 2,520 |
| Tensile, p. s. i., 80° F | 3,160 | 2,990 | 3,170 | 2,230 | 2,270 | 3,380 |
| Elongation, percent, 80° F | 390 | 230 | 310 | 380 | 240 | 410 |
| $\Delta T$ ° F | 61.9 | 58.1 | 59.9 | 54.4 | 69.6 | 46.9 |
| Resilience, percent | 65.7 | 56.1 | 67.3 | 66.7 | 62.7 | 69.6 |
| Flex life, thousands of flexures to failure | 9.4 | 2.5 | 1.1 | 4.3 | 4.2 | [1] 71.7 |
| Shore hardness | 61.5 | 70.5 | 65 | 63.5 | 64 | 62 |
| Abrasion loss, grams | 6.89 | 4.70 | 6.58 | 8.26 | 6.53 | 11.27 |

[1] Broken at 50,000 flexures.

The butadiene/3-phenyl-3-butenyl N-ethylcarbamate rubber exhibited superior hot tensile strength and better aged tensile strength than the other synthetic rubbers, and higher flex life, resilience and extrusion rate and lower freeze point than the butadiene/2-phenyl-4-hydroxy-1-butene rubber. The butadiene/3-phenyl-3-butenyl N-ethylcarbamate rubber also exhibited superior retention of tensile strength after aging, superior abrasion resistance and lower freeze point than the 75/25 butadiene/styrene rubber.

*Example II*

The butadiene/3-phenyl-3-butenyl N-ethylcarbamate rubber described in Example I was evaluated in a carcass recipe along with the 75/25 butadiene/2-phenyl-4-hydroxy-1-butene rubber used in Example I. The compounding recipe was as follows:

| | Parts by weight |
|---|---|
| Rubber | 100 |
| Carbon black (Philblack O) | 25 |
| Zinc oxide | 3 |
| Stearic acid | 1 |
| Agerite resin D [1] | 1 |
| Paraflux [2] | 5 |
| Staybelite resin [3] | 2.5 |
| Sulfur | 2.5 |
| Santocure [4] | 0.75 |
| A-32 [5] | 0.15 |

[1] Polymerized trimethyldihydroquinoline.
[2] Saturated polymerized hydrocarbon.
[3] Hydrogenated rosin.
[4] N-cyclohexyl-2-benzothiazolesulfenamide.
[5] Reaction product of butyraldehyde and butylidene aniline.

The stocks were compounded, cured 30 minutes at 307° F., and physical properties determined. The following results were obtained:

|  | Butadiene/3-phenyl-3-butenyl N-ethylcarbamate | Butadiene/2-phenyl-4-hydroxy-1-butene |
|---|---|---|
| Unaged Samples: | | |
| Compression set, Percent | 13.5 | 13.2 |
| 300% Modulus, p. s. i., 80° F | 790 | 1,020 |
| Tensile, p. s. i., 80° F | 3,460 | 3,180 |
| Elongation, Percent, 80° F | 640 | 505 |
| 200° F. maximum tensile, p. s. i. | 600 | 560 |
| $\Delta T$ ° F | 35.1 | 37.8 |
| Resilience, Percent | 75.9 | 63.2 |
| $\Delta T$ ° at blowout | 131.4 | 125.5 |
| Minutes to blowout | 13.4 | 22.9 |
| Flex life, thousands of flexures to failure | 1.0 | 0.7 |
| Shore hardness | 47 | 51 |
| Compounded MS-1½ | 26.5 | 27 |
| Oven Aged 24 Hours at 212° F.: | | |
| Tensile, p. s. i., 80° F | 2,350 | 1,460 |
| Elongation, Percent, 80° F | 440 | 240 |
| $\Delta T$ ° F | 32.8 | 36.5 |
| Resilience, Percent | 79.2 | 66.4 |
| Flex life, thousands of flexures to failure | <0.2 | <0.2 |
| Shore hardness | 52.5 | 58 |

The butadiene/3-phenyl-3-butenyl N-ethylcarbamate rubber exhibited superior hot tensile strength and aged tensile strength, especially the latter, than the butadiene/2-phenyl-4-hydroxy-1-butene rubber. Other superior properties exhibited by the butadiene/3-phenyl-3-butenyl N-ethylcarbamate rubber were hysteresis value ($\Delta T$ ° F.), resilience, flex life in the unaged sample.

*Example III*

Ethyl isocyanate was added in variable proportions to 2-phenyl-4-hydroxy-1-butene and the several reaction mixtures polymerized with butadiene in aqueous emulsion at 41° F. In one run, sufficient ethyl isocyanate was added to the 2-phenyl-4-hydroxy-1-butene to convert it all to 3-phenyl-3-butenyl N-ethylcarbamate. In the other runs only a portion of the hydroxybutene was converted to the carbamate. Polymerizations were effected in accordance with the following recipe:

| | Parts by weight |
|---|---|
| Butadiene | 75 |
| 2-phenyl-4-hydroxy-1-butene | variable |
| 3-phenyl-3-butenyl N-ethylcarbamate | variable |
| Water | 180 |
| Potassium fatty acid soap | 5 |
| Tert-dodecyl mercaptan | 0.19 |
| Diisopropylbenzene hydroperoxide | 0.107 |
| $FeSO_4 \cdot 7H_2O$ | 0.140 |
| $K_4P_2O_7$ | 0.165 |
| KCl | 0.50 |

Results were as follows:

| Run No. | 2-phenyl-4-hydroxy-1-butene, Parts | 3-phenyl-3-butenyl N-ethylcarbamate | Reaction Time, Hrs. | Conversion, Percent |
|---|---|---|---|---|
| 1 | 25.0 | 0.0 | 29.75 | 60 |
| 2 | 24.5 | 0.5 | 28.75 | 60 |
| 3 | 24.0 | 1.0 | 28.25 | 61 |
| 4 | 20.0 | 5.0 | 23.5 | 61 |
| 5 | 0.0 | 25.0 | 11.0 | 65 |

Mooney values were determined on polymers from Runs 1 and 5. Values were obtained at 4 minutes at 212° F. (ML-4) and at 8 minutes at 280° F. (ML-8). Results were as follows:

| Polymer from Run | ML-4 | ML-8 |
|---|---|---|
| 1 | 51 | 29 |
| 5 | 105 | 99 |

*Example IV*

3-phenyl-3-butenyl N-phenylcarbamate was prepared by adding a slight excess of 2-phenyl-4-hydroxy-1-butene to phenyl isocyanate and warming the mixture to 50° C. for 30 minutes. The reaction product, without purification, was copolymerized with butadiene in an emulsion system at 41° F. Two runs were made using the following recipes:

| | Parts by Weight | |
|---|---|---|
| | I | II |
| Butadiene | 75 | 75 |
| 3-phenyl-3-butenyl N-phenylcarbamate | 25 | 25 |
| Water | 180 | 180 |
| Potassium fatty acid soap | 5 | 5 |
| Tert-dodecyl mercaptan | 0.25 | 0.25 |
| $K_4P_2O_7$ | 0.165 | 0.33 |
| $FeSO_4 \cdot 7H_2O$ | 0.140 | 0.28 |
| KCl | 0.50 | 0.50 |
| Diisopropylbenzene hydroperoxide | 0.107 | 0.214 |

A third run was made using a 75/25 ratio of butadiene/2-phenyl-4-hydroxy-1-butene. Recipe I was used for this run. Results were as follows:

| Second Monomer | Conversion, Percent | | |
|---|---|---|---|
| | 3 Hrs. | 5.2 Hrs. | 22 Hrs. |
| 3-phenyl-3-butenyl N-phenylcarbamate (I) | 33 | 58 | 85 |
| 3-phenyl-3-butenyl N-phenylcarbamate (II) | 52 | 71 | 87 |
| 2-phenyl-4-hydroxy-1-butene | 7 | 9 | 39 |

It will be appreciated that numerous specific modifications of our invention may be practiced from the teachings and discussion contained in this specification. Various modifications will become apparent from this disclosure and discussion, to those skilled in the art, without departing from the scope or spirit of the teachings of the disclosure.

Having described our invention, we claim:

1. A process for making a polymeric product which comprises polymerizing under polymerizing conditions in an aqueous emulsion a mixture of 3-phenyl-3-butenyl N-ethylcarbamate and 1,3-butadiene in the presence of diisopropylbenzene hydroperoxide polymerization catalyst, and recovering a polymeric material as the product of the process.

2. A process for making a polymeric product which comprises polymerizing in an aqueous emulsion a mixture of 3-phenyl-3-butenyl N-phenyl carbamate and 1,3-butadiene in the presence of diisopropylbenzene hydroperoxide polymerization catalyst, and recovering a polymeric material as the product of the process.

3. As a new composition of matter, a polymer of 3-phenyl-3-butenyl carbamate and a copolymerizable compound comprising a conjugated diene.

4. As a new composition of matter, a polymer of 3-phenyl-3-butenyl N-methylcarbamate and a copolymerizable compound comprising a conjugated diene.

5. As a new composition of matter, a polymer of 3-phenyl-3-butenyl N-ethylcarbamate and a copolymerizable compound comprising a conjugated diene.

6. As a new composition of matter, a polymer of 3-phenyl-3-butenyl N-phenylcarbamate and a copolymerizable compound comprising a conjugated diene.

7. As a new composition of matter, a copolymer of 3-phenyl-3-butenyl N-ethylcarbamate and 1,3-butadiene.

8. As a new composition of a matter, a copolymer of 3-phenyl-3-butenyl N-phenylcarbamate and 1,3-butadiene.

9. A process for making a polymeric product which comprises polymerizing under polymerizing conditions in an aqueous emulsion a mixture of (1) a compound having the general formula

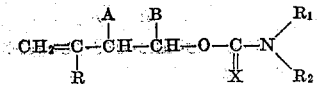

where R is an aryl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and mono-olefinic cyclic hydrocarbon, saturated and mono-olefinic acyclic hydrocarbon, and aromatic, and wherein the total number of carbon atoms in R, and the sum of carbon atoms in $R_1$ and $R_2$, each does not exceed 12, and (2) a copolymerizable compound comprising a conjugated diene, and recovering a polymeric material as the product of the process.

10. The process according to claim 9 in which X is oxygen.

11. The process according to claim 9 wherein X is sulfur.

12. A process for making a polymeric product which comprises polymerizing under polymerizing conditions in an aqueous emulsion a mixture of (1) a compound having the general formula

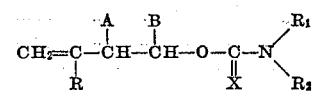

wherein R is a phenyl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and mono-olefinic cyclic hydrocarbon, saturated and mono-olefinic acyclic hydrocarbon, and aromatic, and wherein the total number of carbon atoms in R, and the sum of carbon atoms in $R_1$ and $R_2$, each does not exceed 12, and (2) a copolymerizable compound comprising a conjugated diene, and recovering a polymeric material as a product of the process.

13. The process according to claim 12 wherein said conjugated diene is butadiene.

14. The process according to claim 12 wherein said conjugated diene is selected from the group consisting of butadiene and isoprene.

15. A process for making a rubber-like polymeric product which comprises polymerizing under polymerizing conditions in an aqueous emulsion a mixture of (1) a compound having the general formula

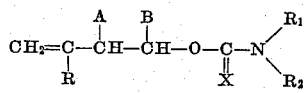

wherein R is an aryl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and mono-olefinic cyclic hydrocarbon, saturated and mono-olefinic acyclic hydrocarbon, and aromatic, and wherein the total number of carbon atoms in R, and the sum of carbon atoms in $R_1$ and $R_2$, each does not exceed 12, and (2) a copolymerizable compound comprising a conjugated diene, wherein from 0.5 to 60 parts by weight of said compound (1) is employed per 100 parts of said compound (2), and recovering a rubber-like polymeric material as a product of process.

16. A process for making a polymeric product which comprises polymerizing under polymerizing conditions in an aqueous emulsion a mixture of (1) a compound having the general formula

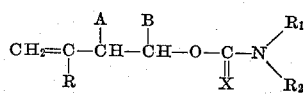

wherein R is an aryl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and mono-olefinic cyclic hydrocarbon, saturated and mono-olefinic acyclic hydrocarbon, and aromatic, and wherein the total number of carbon atoms in R, and the sum of carbon atoms in $R_1$ and $R_2$, each does not exceed 12, and (2) a copolymerizable compound comprising a conjugated diene, wherein said polymerizing is carried out in the presence of a polymerization catalyst selected from the group consisting of peroxides, persulfates, hydroperoxides, and diazo thioethers, and recovering a polymeric material as a product of the process.

17. The process according to claim 16 wherein said polymerization catalyst is a hydroperoxide polymerization catalyst.

18. The process according to claim 16 wherein said polymerization catalyst is diisopropylbenzene hydroperoxide.

19. As a new composition of matter, a polymer of (1) a compound having the general formula

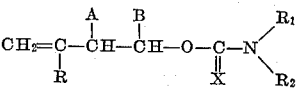

wherein R is an aryl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and mono-olefinic cyclic hydrocarbon, saturated and mono-olefinic acyclic hydrocarbon, and aromatic, and wherein the total number of carbon atoms in R, and the sum of carbon atoms in $R_1$ and $R_2$, each does not exceed 12, and (2) a copolymerizable compound comprising a conjugated diene.

20. The composition according to claim 19 wherein said conjugated diene is butadiene.

21. The composition according to claim 19 wherein said conjugated diene is selected from the group consisting of butadiene and isoprene.

22. A vulcanized composition obtained by adding carbon black to the composition of claim 19 and vulcanizing the resultant mixture with sulfur.

23. A rubber-like copolymer comprising 40 to 99.5 parts by weight of a conjugated diene and 60 to 0.5 parts by weight of a compound having the general formula

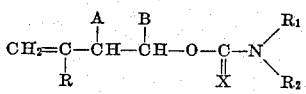

where R is an aryl radical, A and B are radicals selected from the group consisting of hydrogen, methyl and ethyl, X is a radical selected from the group consisting of oxygen and sulfur, and where $R_1$ and $R_2$ are radicals selected from the group consisting of hydrogen, saturated and mono-olefinic cyclic hydrocarbon, saturated and mono-olefinic acyclic hydrocarbon, and aromatic, and wherein the total number of carbon atoms in R, and the sum of carbon atoms in $R_1$ and $R_2$, each does not exceed 12.

24. A rubber-like copolymer according to claim 23 wherein X is oxygen.

25. A vulcanized composition obtained by mixing the rubber-like copolymer of claim 23 with carbon black and vulcanizing the resulting mixture with sulfur.

26. As an article of manufacture, a pneumatic tire having a tread and a carcass, at least one of said tread and said carcass comprising in its composition a sulfur vulcanized and carbon black reinforced polymer, said polymer having been obtained by polymerizing under polymerizing conditions in an aqueous emulsion a mixture of monomers comprising 40 to 99.5 parts by weight of a conjugated diene and 60 to 0.5 parts by weight of a compound having the general formula

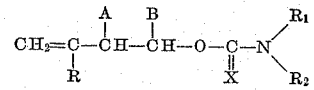

wherein R is an aryl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and mono-olefinic cyclic hydrocarbon, saturated and mono-olefinic acyclic hydrocarbon, and aromatic, and where the total number of carbon atoms in R, and the sum of carbon atoms in $R_1$ and $R_2$, each does not exceed 12.

27. In a process for making a pneumatic tire having a tread and a carcass, the improvement comprising fabricating at least one of said tread and said carcass from a sulfur vulcanized and carbon black reinforced polymer obtained by polymerizing under polymerizing conditions a mixture of monomers comprising 40 to 99.5 parts by weight of a conjugated diene and 60 to 0.5 parts by weight of a compound having the general formula

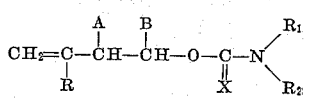

wherein R is an aryl radical, A and B are radicals selected from the group consisting of hydrogen, methyl and ethyl, X is a radical selected from the group consisting of oxygen and sulfur, and wherein $R_1$ and $R_2$ are radicals selected from the group consisting of hydrogen, saturated and mono-olefinic cyclic hydrocarbon, saturated and mono-olefinic acyclic hydrocarbon, and aromatic, and where the total number of carbon atoms in R, and the sum of carbon atoms in $R_1$ and $R_2$, each does not exceed 12.

References Cited in the file of this patent

UNITED STATES PATENTS

| | | |
|---|---|---|
| 2,384,074 | Chenicek | Sept. 4, 1945 |
| 2,483,194 | Gleim | Sept. 27, 1949 |
| 2,687,403 | Ballard et al. | Aug. 24, 1954 |
| 2,697,720 | Kaiser | Dec. 21, 1954 |